United States Patent [19]

Tsuchida

[11] Patent Number: 5,018,497
[45] Date of Patent: May 28, 1991

[54] MULTIPLE VALVE INTERNAL COMBUSTION ENGINE

[75] Inventor: Naoki Tsuchida, Iwata, Japan

[73] Assignee: Yamaha Hatsudoki Kabushika Kaisha, Iwata, Japan

[21] Appl. No.: 527,564

[22] Filed: May 23, 1990

[30] Foreign Application Priority Data

May 29, 1989 [JP] Japan .................................. 1-137053
May 29, 1989 [JP] Japan .................................. 1-137054

[51] Int. Cl.⁵ ............................................ F02M 35/10
[52] U.S. Cl. .................................. 123/432; 123/90.27
[58] Field of Search ............... 123/432, 90.16, 90.17, 123/90.6, 90.27

[56] References Cited

U.S. PATENT DOCUMENTS

| | | | |
|---|---|---|---|
| 4,651,696 | 3/1987 | Yoshikawa | 123/432 |
| 4,660,529 | 4/1987 | Yoshikawa | 123/432 |
| 4,932,377 | 6/1990 | Lyles | 123/432 |

Primary Examiner—E. Rollins Cross
Attorney, Agent, or Firm—Ernest A. Beutler

[57] ABSTRACT

A multiple valve engine and more particularly an improved combustion chamber and valve arrangement for such an engine that permits high compression ratios, good breathing and a smooth combustion chamber. There are provided three intake valves and two exhaust valves. The center intake valve is supported so that it reciprocates about an axis that lies in a plane containing the cylinder bore axis. The other valves are all inclined to each other so that adjacent edges between the valves will all lie in a common plane that extends perpendicularly to the cylinder bore axis to provide a smooth combustion chamber configuration. In addition, tapered cam lobes on the camshafts operate the angularly disposed valves. These tapered cam lobes have heel diameters that are larger than the adjacent bearing surfaces of the cams so that the cam lobes may be conveniently formed by grinding without damaging the bearing surfaces.

18 Claims, 7 Drawing Sheets

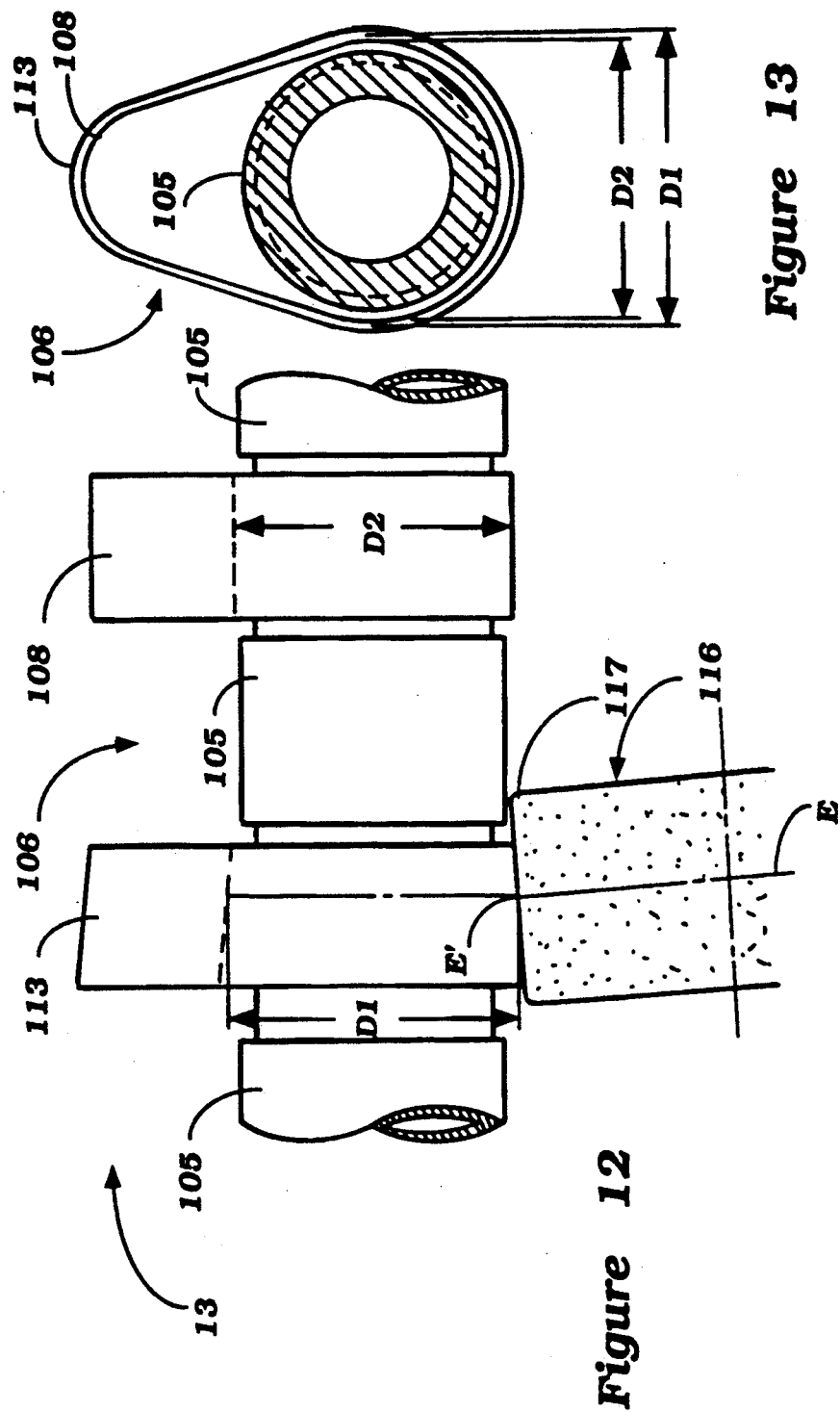

MULTIPLE VALVE INTERNAL COMBUSTION ENGINE

BACKGROUND OF THE INVENTION

This invention relates to a multiple valve internal combustion engine and more particularly to an improved combustion chamber and valve arrangement for such an engine.

It is generally recognized that the breathing capabilities of an internal combustion engine can be improved by using plural valves rather than individual valves of a large diameter. The use of four valves per cylinder has been generally regarded as the practical limit. Such arrangements employ two intake valves and two exhaust valves. The reason why four valves per cylinder has been deemed to be the practical limit is the trade off between breathing capacity and combustion chamber configuration and volume. That is, if engines are employed that utilize more than four valves per cylinder, the combustion chamber surface area becomes quite large and the clearance volume also increases. As a result, it is difficult to provide a high compression ratio, which is also necessary in order to achieve maximum output for the displacement of the engine.

Recently, a combustion chamber configuration has been proposed that will permit the use of five valves (three intake and two exhaust) for each combustion chamber of the engine without adversely effecting the combustion chamber surface area or reducing the compression ratio. Such a valve arrangement is shown in U.S. Pat. No. 4,660,529, issued Apr. 28, 1987 in the name of Masaaki Yoshikawa, entitled "Four-Cycle Engine" and assigned to the assignee of this application. Although the valve placement disclosed in that patent does permit the use of five valves per cylinder without adversely effecting the compression ratio or the combustion chamber surface volume, it has certain difficulties.

The difficulties of the prior art construction may be best understood by reference to FIGS. 1 through 3 which are, respectively, a cross sectional view taken through a horizontal plane looking generally in the direction of the arrow 1 in FIG. 2, a cross sectional view taken along the line 2—2 in FIG. 1 and a side elevational view taken generally along a plane shown by the line 3—3 in FIG. 1, with portions removed to show the valve orientation.

Only a single cylinder of the engine is depicted because it is believed that those skilled in this art will understand how the construction is applied to multiple cylinder engines. The engine includes a cylinder block 11 having a cylinder bore 12 which is, conventionally, of the right circular configuration, although other configurations may be employed. A cylinder head 13 is affixed to the cylinder block 11 and closes the upper end of the cylinder bore 12, as is well known. A combustion chamber, indicated generally by the reference numeral 14 is formed by the cylinder bore 12, the head of the piston (not shown) and a recess 15 formed in the cylinder head 13. This recess is defined by a surface 16 that is somewhat smaller in size than the cylinder bore 12 so as to provide some squish area that extends around this recess surface 16

The cylinder head surface 16 is formed with a central intake port 17 and a pair of side intake ports 18 and 19 which are generally circular in configuration. A center intake valve 21 cooperates with the center intake port 17 so as to control the flow through this intake port. A pair of side intake valves 22 and 23 cooperate with the side intake ports 18 and 19 so as to control the flow through these ports.

In accordance with the construction described in the aforenoted U.S. Pat. No. 4,660,529, the intake valves 21, 22 and 23 are supported so that the axes of reciprocation defined by the stems of these valves are disposed at certain angular relationships. However, the axes of reciprocation all lie in planes that are parallel to each other and parallel to a plane containing the axis of the cylinder bore 12. Generally, the center intake valve 21 has its valve stem reciprocating in this latter mentioned plane. The reason for this orientation is so that the valves can all be operated conveniently by the lobes of a single camshaft. To that end, the axes of reciprocation all intersect on a line that is coincident with the axis of rotation of this camshaft.

As a result of this configuration, the areas 24 of the cylinder head formed between the intake port 1 and the intake ports 18 and 19 has a somewhat irregular configuration. This configuration may be understood by reference to the figures and is necessary in order to permit the valves to operate conveniently in the aforedescribed manner.

A pair of exhaust ports 25 are positioned on the opposite side of a plane passing through the cylinder bore axis and perpendicular to the plane containing the axis of reciprocation of the valve 21. As mentioned in the aforenoted United States Letters Patent, the intake ports 18 and 19 extend slightly over onto the other side of this plane. A pair of exhaust valves 27 and 28 control the flow through the exhaust ports 25 and 26. The exhaust valves 27 and 28 reciprocate along lines that lie within a common plane and in planes that are parallel to each other and parallel to the plane containing the axis of reciprocation of the intake valve 21. As a result, the valves 27 and 28 may be operated by a single exhaust camshaft that rotates about an axis that is parallel to the axis of rotation of the intake camshaft.

A spark plug 29 is positioned generally centrally in the combustion chamber 14 and lies generally on the plane containing the axis of reciprocation of the intake valve 21 and on the cylinder bore axis.

As aforenoted, the described combustion chamber, although compact and permitting good breathing, does have some disadvantages in that there is some masking of the valves and the combustion chamber surface is not smooth.

It is, therefore, a principal object of this invention to provide an improved combustion chamber and valve arrangement for a multiple valve internal combustion engine.

It is a further object of this invention to provide an improved five valve per cylinder arrangement for an internal combustion engine that permits the use of a high compression ratio, good breathing, and which provides also a smooth combustion chamber.

It is a further object of this invention to provide an improved arrangement for operating and locating the valves in a five valve per cylinder engine.

It has been found that the aforenoted results can be achieved by skewing the axes of reciprocation of the side intake valves so that they do not reciprocate in planes that are parallel to the plane of reciprocation of the center intake valve. In order to accomplish this and still drive the arrangement with a single camshaft, it is, therefore, desirable to provide angularly disposed cam lobes that operate these side valves. However, the formation of such angularly disposed lobes gives rise to certain manufacturing problems.

It is, therefore, a still further object of this invention to provide an arrangement for forming a camshaft that is adapted to operate valves that are angularly disposed and wherein a tapered cam lobe may be conveniently formed.

SUMMARY OF THE INVENTION

A first feature of this invention is adapted to be embodied in a combustion chamber and valve arrangement for an internal combustion engine having a cylinder bore that is closed at one end by a cylinder head having a surface facing the cylinder bore. A pair of valve seats are formed in the cylinder head surface and define flow ports communicating with the combustion chamber. A pair of poppet valves are supported for reciprocation about respective axes by the cylinder head. Each poppet valve has a head portion for cooperating with the valve seats for controlling the flow through the flow ports. The axes of reciprocation of the valves are angularly disposed to each other and do not lie in parallel planes. The valves are disposed so that the adjacent edges of their heads lie in substantially a common plane extending perpendicular to the axis of the cylinder bore.

Another feature of the invention is adapted to be embodied in a camshaft arrangement for operating angularly disposed valves. The camshaft has a pair of lobes spaced by a bearing surface. At least one of the cam lobes is tapered. The tapered cam lobe has its minimum circumferential dimension greater than the diameter of the bearing area so that the tapered surface can be formed by a grinding wheel without interfering with the bearing surface.

BRIEF DESCRIPTION OF THE DRAWINGS

FIG. 12 is a further enlarged cross sectional view of a portion of the intake camshaft showing the manner in which the cam lobe may be formed.

FIG. 13 is an end elevational view of the camshaft taken in the direction of the arrow 13 in FIG. 12.

DETAILED DESCRIPTION OF THE PREFERRED EMBODIMENT OF THE INVENTION

Figure 1:
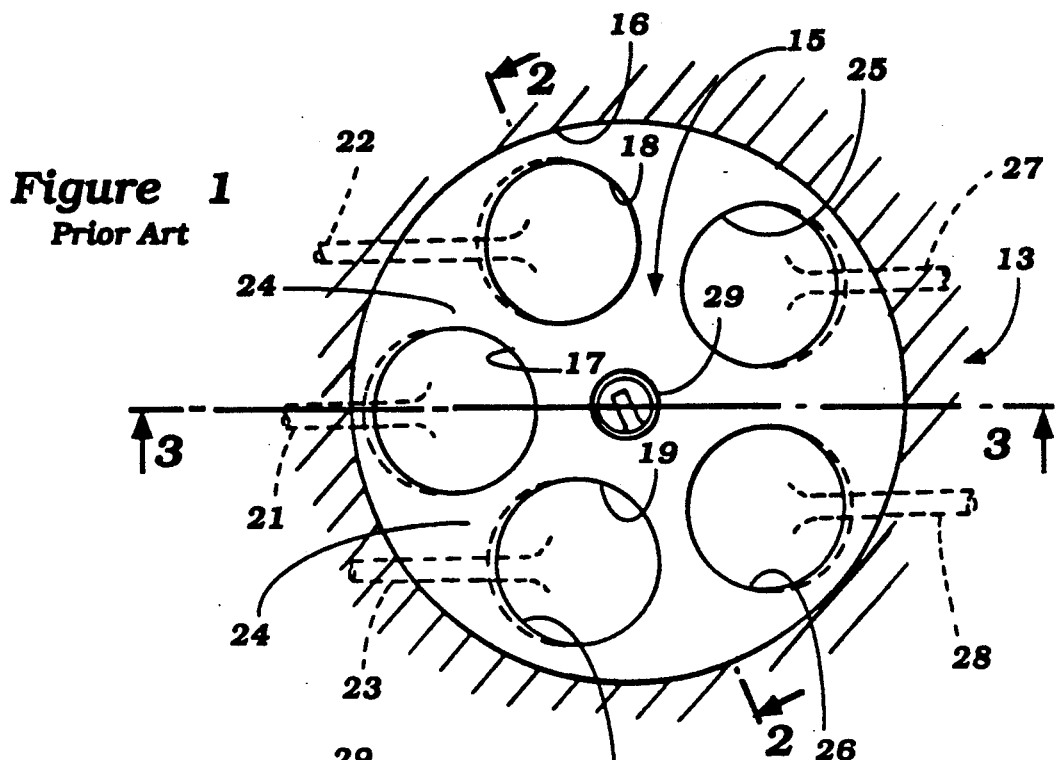
FIG. 1 is a bottom plan view of a cylinder head with portions shown in section and taken generally in the direction of the arrow 1 in FIG. 2 and shows a prior art type of multiple valve engine construction.
Figure 2:
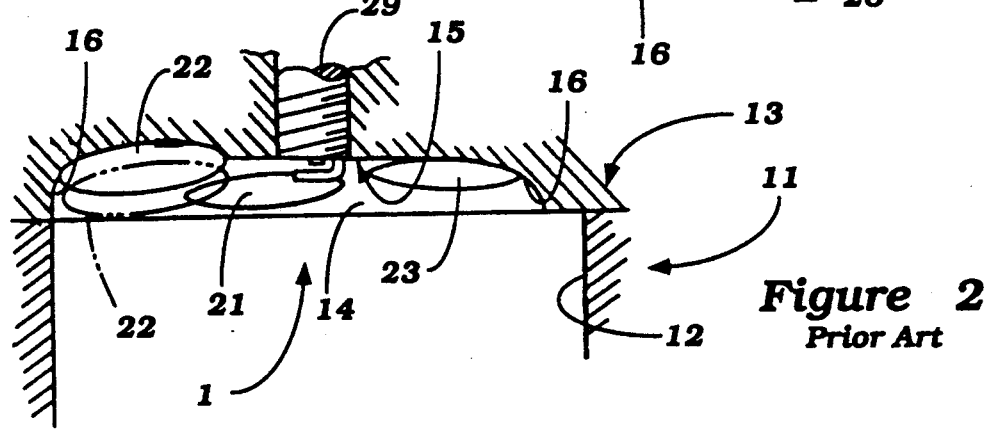
FIG. 2 is a cross sectional view taken along the line 2—2 of FIG. 1.
Figure 3:
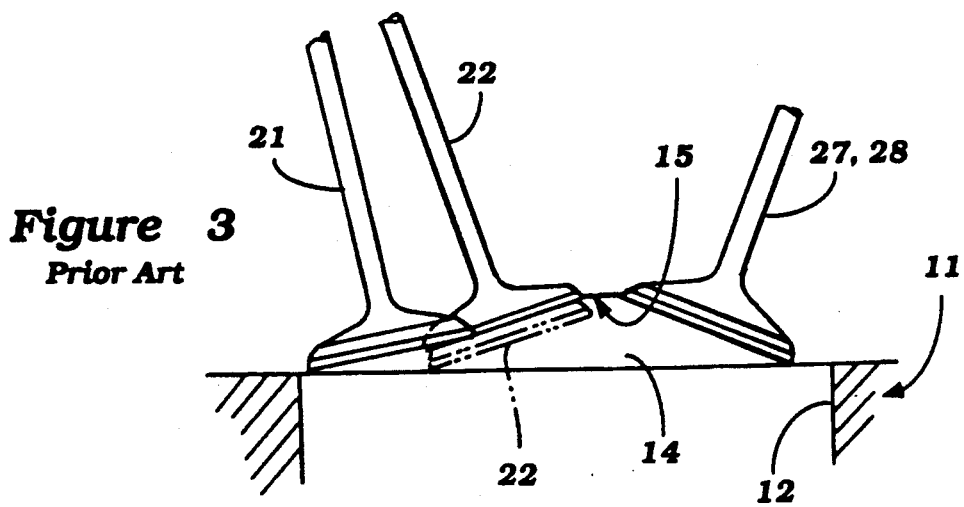
FIG. 3 is a view taken in part along a cross section and generally in the direction of the line 3—3 of FIG. 1.

Referring now in detail to FIGS. 4 through 13, an internal combustion engine construction constructed in accordance with an embodiment of the invention is identified generally by the reference numeral 51. As with the description of the prior art, the invention will be described in conjunction with a single cylinder of the engine since it is believed that the application of the principles of the invention to multiple cylinder engines will be well within the scope of those skilled in the art.

Also, the basic configuration of the engine 51 is the same as the prior art construction, except for the orientation of the intake and exhaust valves, the configuration of the combustion chamber and the manner in which the intake and exhaust valves are operated. However, in order to permit those skilled in the art to understand the invention, the entire construction of the relevant portion of the engine will be described.

The engine 51 includes a cylinder block 52 having one or more cylinder bores 53 which may be of any configuration and, in the illustrated embodiment, are right circular cylinders. Pistons, not shown, are reciprocally supported in the cylinder bores 53 and drive an associated crankshaft (not shown) in a known manner.

A cylinder head assembly, indicated generally by the reference numeral 54, which includes a main cylinder head casting 55, is affixed to the cylinder block 52 in an appropriate manner. The cylinder head assembly 54 is shown in most detail in FIGS. 8 and 9. The cylinder head casting 55 has a lower surface or recess 56 that cooperates with the cylinder bore 53 and head of the piston to define a combustion chamber 57. The cylinder head surface 56 is recessed from a planar lower face 58 of the cylinder head that is sealingly engaged with the upper deck of the cylinder block 52 and which defines a squish area around the cylinder head recess 56.

Figure 4:
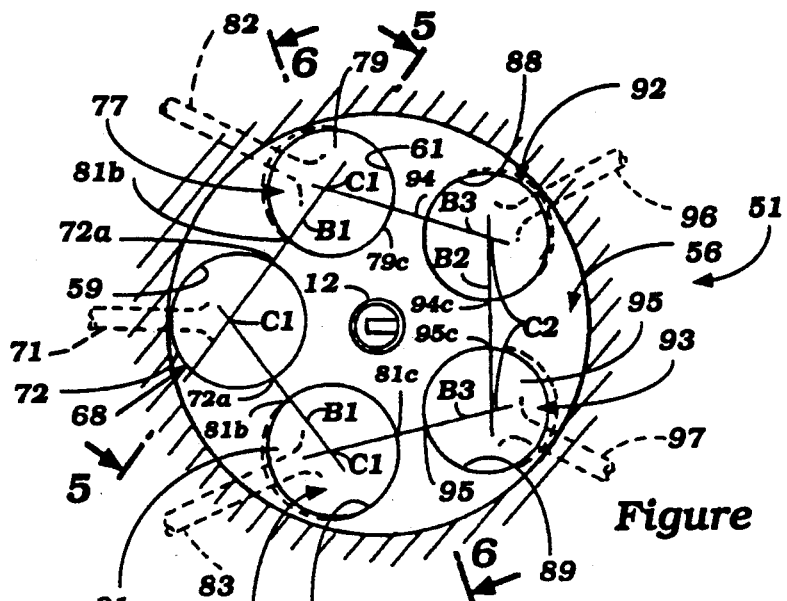
FIG. 4 is a bottom plan view, in part similar to FIG. 1, of a cylinder head construction constructed in accordance with an embodiment of the invention.
Figures 5, 6:
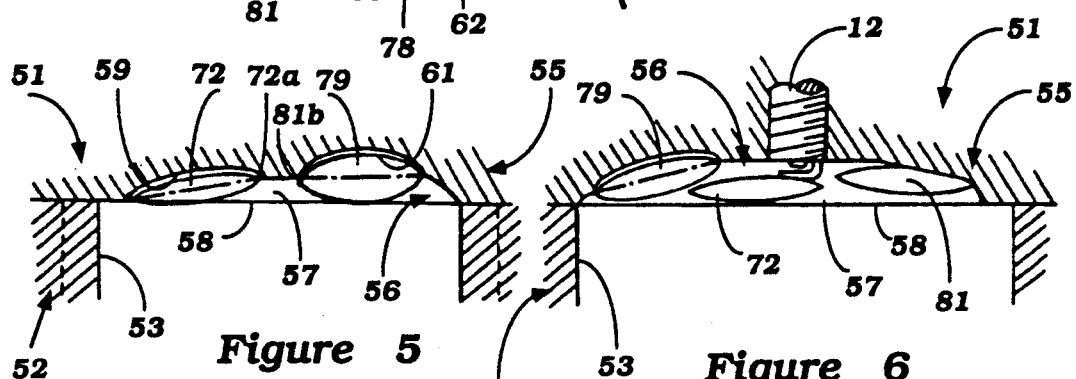
FIG. 5 is a cross sectional view taken along the line 5—5 of FIG. 4.
FIG. 6 is a cross sectional view taken along the line 6—6 of FIG. 4.
Figure 7:
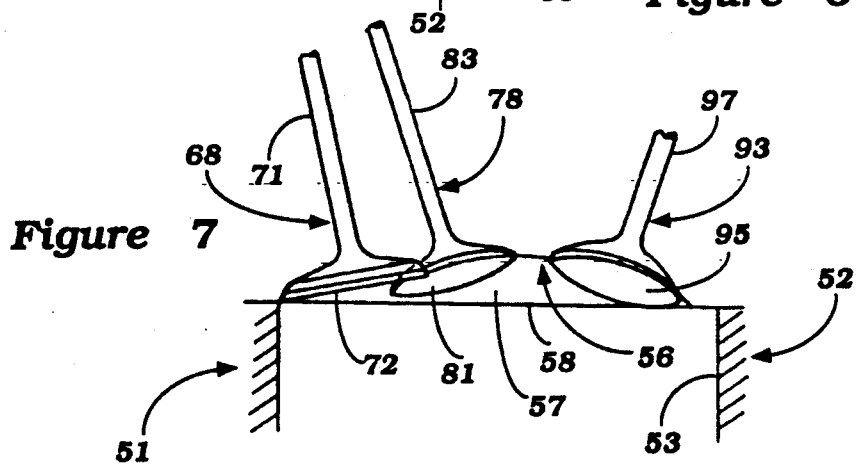
FIG. 7 is a side elevational view, partially in section, in part similar to FIG. 3 and shows the orientation of the valves in accordance with this embodiment of the invention.

Formed within the cylinder head recess 56 is a center intake port 59 and a pair of side intake ports 61 and 62 (FIG. 4). The intake ports 61 and 62 extend slightly over one side of a plane containing the axis of reciprocation of the cylinder bore and which is perpendicular to the plane of FIG. 9. In this regard, the construction is the same as the prior art. However, as will be described, the angular orientation of the ports 61 and 62 relative to a plane that extends perpendicularly to the cylinder bore axis is different from the prior art.

The intake ports 59, 61 and 62 are all served by a common intake passage 63 that is formed in the cylinder head casting 5 and which extends from a single inlet that is served by an intake manifold 64 (FIG. 9) in which a fuel injection nozzle 65 is positioned. An intake trumpet 66 extends across the upper end of the intake manifold 64 and a slide type throttle valve 67 controls the air flow to the intake passage 63 in a known manner. Alternatively, three separate intake passages may be employed, one serving each of the intake ports 59, 61 and 62 rather than the siamese type of arrangement described. Also, other types of intake passages and throttle valves may be employed without departing from the invention.

Figure 9:
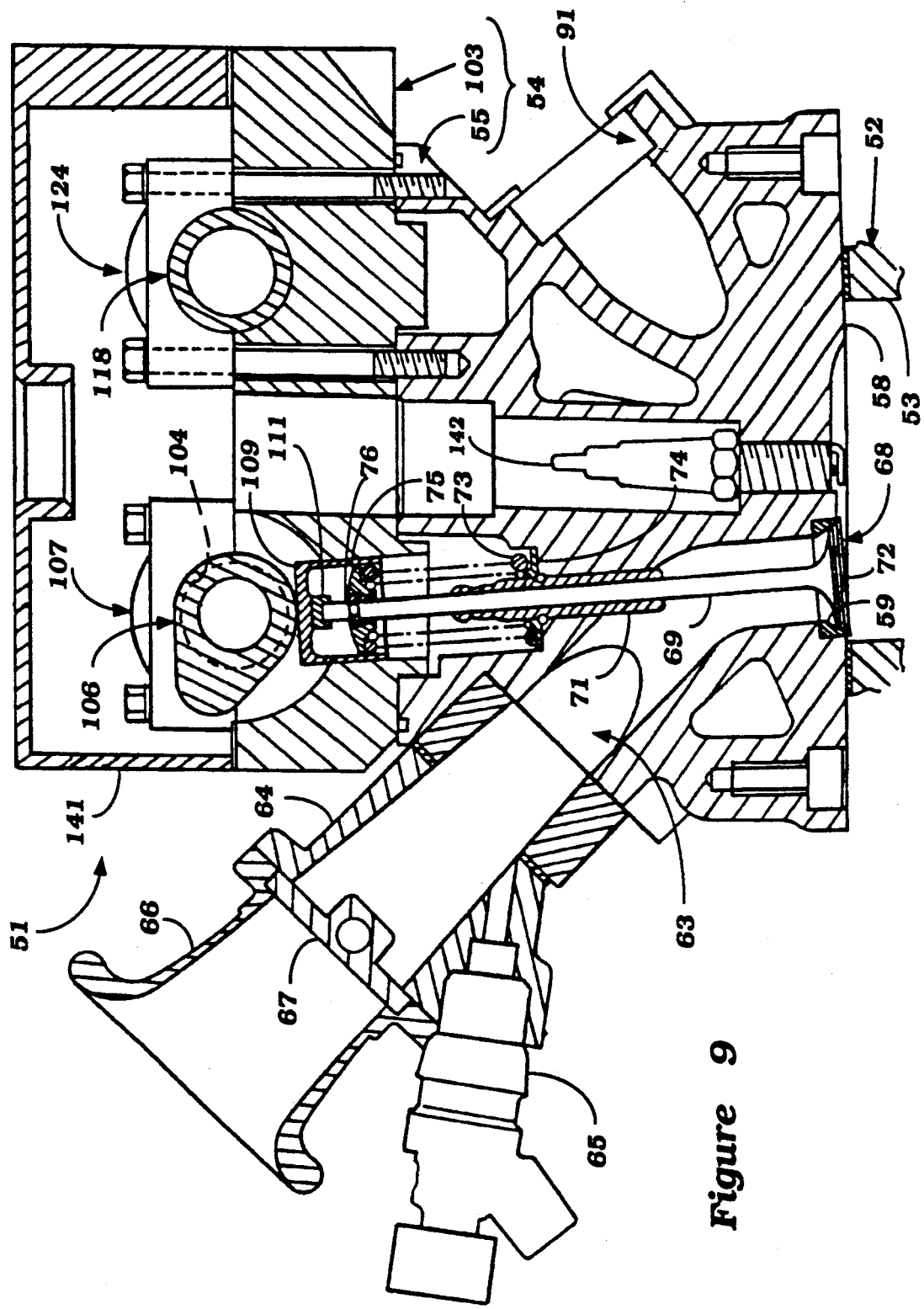
FIG. 9 is a cross sectional view, in part similar to FIG. 8, but is taken along a plane containing the axes of reciprocation of the center intake valve and the cylinder bore.
Figure 10:
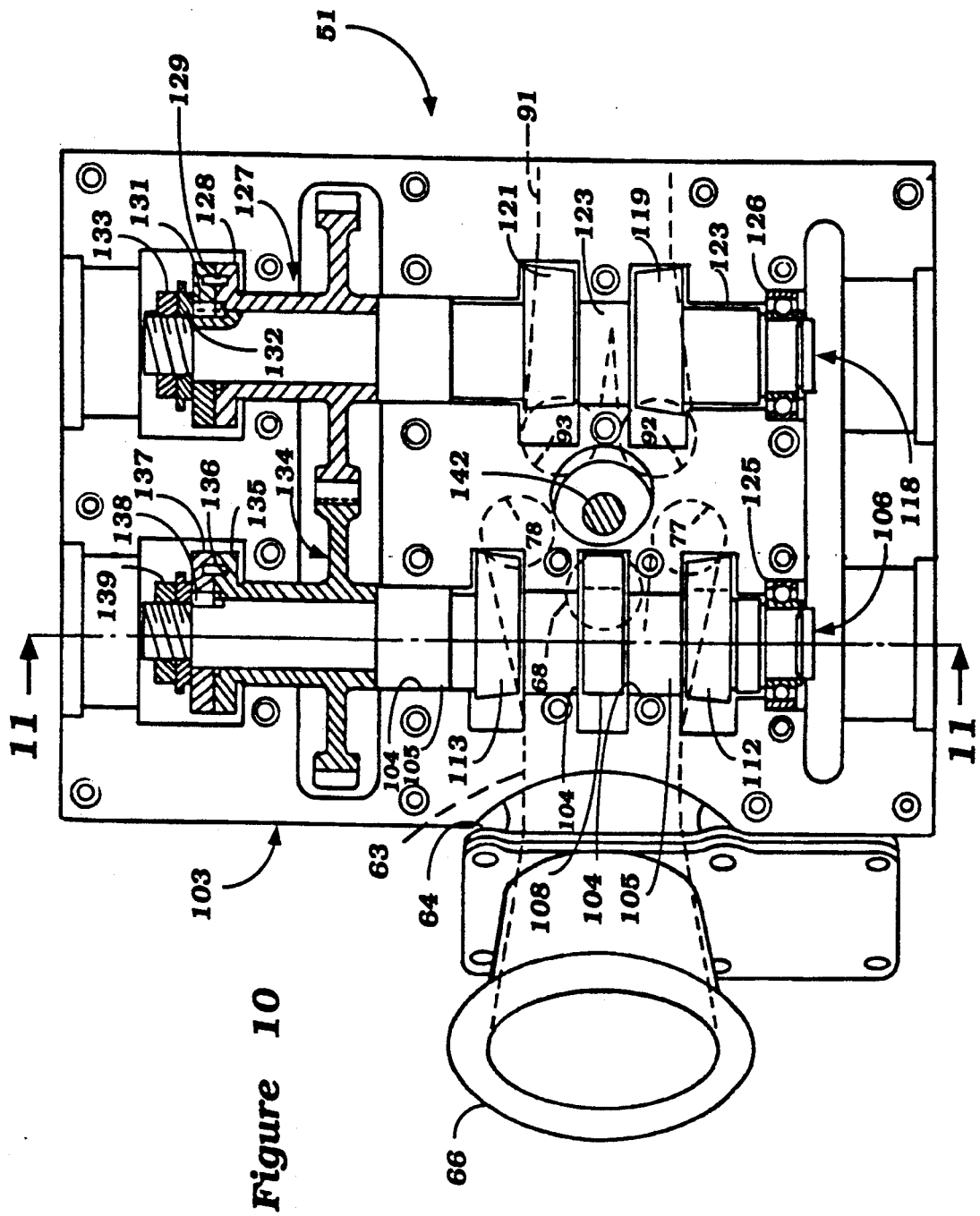
FIG. 10 is a top plan view of a portion of the cylinder head with the cam cover removed and portions of the cam driving mechanism shown in cross section.
Figure 11:
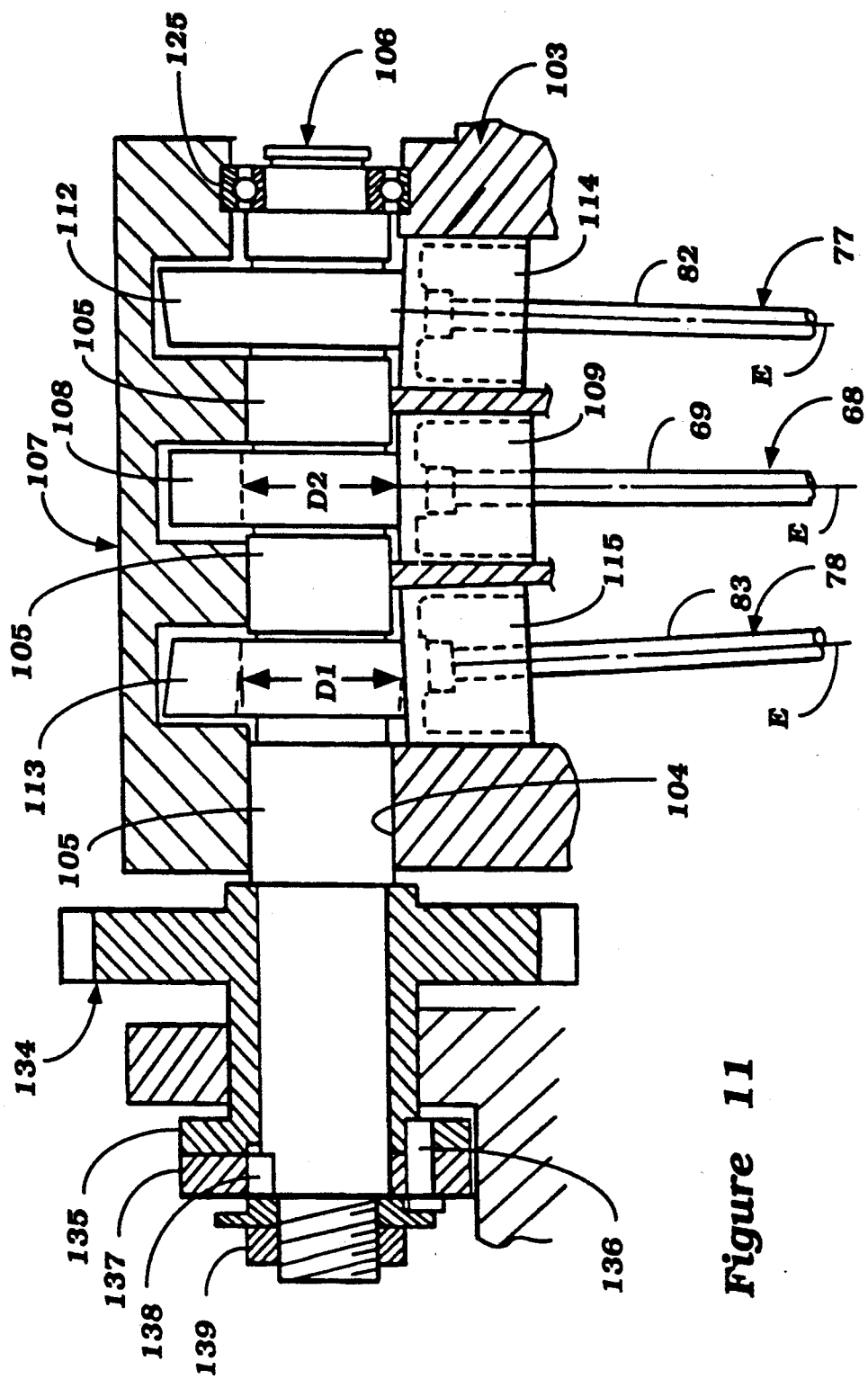
FIG. 11 is an enlarged cross sectional view taken along the line 11—11 of FIG. 10.

A center intake valve, indicated generally by the reference numeral 68 has a stem portion 69 that is slidably supported within the cylinder head casting 55 by means of a pressed in valve guide 71 (FIG. 9). The axis of reciprocation of the center intake valve 68 defined by the stem 69 and guide 71 is at a relatively small acute angle to the cylinder bore axis and lies in a plane that intersects the cylinder bore axis. The valve 68 has a head portion 72 that cooperates with the valve seat 69 to control the flow of intake charge to the combustion chamber 57 through this valve seat. A coil compression spring 73 encircles the valve stem 69 and acts against a wear pad 74 placed in the cylinder head casting 57 and against a retainer assembly 75 that is affixed to the valve stem 69 by a keeper 76 for urging the valve 68 to its closed position. The construction for opening the valve 68 will be described later.

A pair of side intake valves, indicated generally by the reference numerals 77 and 78 have respective head portions that cooperate with the valve seats 61 and 62 so as to control the flow of intake charge to and from them. These head portions are indicated by the reference numerals 79 and 81, respectively. Like the center intake valve 68, side intake valves 77 and 78 have respective stem portions 82 and 83 that are slidably supported in the cylinder head casting 55 by respective valve guides 84 (only one of which is shown in the drawings and appears in FIG. 8).

Coil compression springs 85 encircle the valve stems 82 and 83 and bear against wear plates 86. The opposite ends of the springs 85 bear against retainers 86 that are held to the upper ends of the valve stems 82 and 83 by keepers 87 for urging the valves 77 and 78 to their closed positions. The manner in which these valves are opened will also be described later.

It should be noted that the axes of reciprocation of the valves 77 and 78 defined by their respective stems 82 and 83 lie in planes that are not parallel to the plane in which the stem 71 of the valve 68 reciprocates. As a result, the valve stems 71, 82 and 83 are skewed relative to eaCh other and because of this, it is possible to place the valves in such a relationship that the combustion chamber surface defined by the cylinder head recess 56 is relatively smooth. As may be seen in FIGS. 4 and 5, lines B1 extending between the center Cl of the center intake valve head and the heads of the side intake valves 77 and 78 when these valves are closed will result in the adjacent edges of the valve heads indicated by the reference numerals 72a, 79b and 81b all lying in a plane that is perpendicular to the cylinder bore axis and which passes through these edges. Said another way, the height of the edges aforedescribed is such that they will be at the same distance from the upper deck of the cylinder block 52. This provides a very smooth combustion chamber as should be readily apparent.

On the opposite side of the diametrical plane containing the axis of the cylinder bore from the center intake valve 68, there are provided a pair of exhaust valve seats 88 and 89 which define the inlets to an exhaust port 91 that extends through the cylinder head casting 55. There may be either separate exhaust ports 91 for each exhaust valve seat 88 or the exhaust valve ports 91 may be siamese.

A pair of exhaust valves, indicated generally by the reference numerals 92 and 93 control the flow through the respective exhaust valves seats 88 and 89. The exhaust valves 92 and 93 have respective head portions 94 and 95 that cooperate with the valve seats 88 and 89 in a manner which is believed to be obvious. Each of the exhaust valves 92 and 93 has a respective stem portion 96 and 97 that defines the axis of reciprocation of these valves.

Unlike the prior art construction, the valve stems 96 and 97 define axes of reciprocation that do not lie in a common plane but rather which are disposed at an angle to the plane of the intake valve 71 and thus are skewed like the outer intake valves 78 and 79. These exhaust valves are slidably supported in the cylinder head casting 55 by means of pressed in valve guides 98, only one of which appears in FIG. 8, and are urged toward their closed position by coil compression springs 99 that act against wear plates 101 and keeper retainer assemblies 102 as with the intake valves.

It should be noted that the skewed relationship is such that a line C2 passing through the center of the heads 94 and 95 of the exhaust valves 92 and 93 intersects the adjacent edges 94c and 95d at a point where these edges lie in a common plane. This line is indicated by the line B2 with the centers being indicated by the point C2. In addition, line B3 passing through the center C2 of the exhaust valves and the center C1 of the side intake valves define respective edges 94f and 79e and 95f and 81e which also lie in common planes that are perpendicular to the cylinder bore axis so as to provide a smooth combustion chamber configuration.

It should be readily apparent that the described construction permits the use of five valves per cylinder but also provides a small combustion chamber, high compression ratio and, because of the particular orientation described, permits the combustion chamber to have a very smooth configuration. As a result, hot spots and pre ignition problems are substantially precluded. However, the described construction requires a camshaft configuration that is different from the conventional type of camshaft and a special valve operating mechanism, which will now be described by particular reference to FIGS. 8 through 11.

It should be noted that the cylinder head assembly 54 includes a cam carrier 103 that is affixed to the cylinder head casting 55 in a manner to be described and which defines a plurality of arcuate integral bearing surfaces 104 that cooperate with bearing surfaces 105 formed integrally on an intake camshaft, indicated generally by the reference numeral 106. A bearing cap, indicated generally by the reference numeral 107, is affixed to the cam carrier 103 and cylinder head casting 55 so as to not only journal the intake camshaft 106 but also so as to secure these components to each other. It should be noted that the camshaft 106 has a first conventionally configured cam portion 108 that is disposed between a pair of the bearing surfaces 105 and which cooperates with a thimble tappet 109 that is supported within a bore of the cam carrier 103 and which cooperates with the stem 69 of the center intake valve 68 through an adjusting shim 111 for actuation of this intake valve (FIG. 9).

A pair of tapered cam lobes 112 and 113 are disposed outwardly of the center cam lobe 108 and are spaced from it respective of the bearing surfaces 105. These tapered cam lobes 112 and 113 cooperate with respective thimble tappets 114 and 115 that are slidably supported in the cam carrier 103 and which cooperate with the stems 82 and 83 of the outer intake valves 77 and 78 through respective adjusting shims 116, only one of which appears in FIG. 8 of the drawings.

It should be noted from FIGS. 12 and 13 that the center cam lobe 108 which has a generally cylindrical configuration has a heel diameter D1 that is slightly larger than the diameter of the bearing surfaces 105 for machining purposes. For a similar reason, the tapered cam lobes 113 and 112 have a mean heel diameter D1 that is greater than the heel diameter D2 of the center cam lobe 108. The mean diameter is meant to be the center of the cam lobe 113 or specifically the portion of it which engages the center of the respective thimble tappets 114 and 115. This construction permits a grinding wheel 116 (FIG. 12) to grind the cam lobe surface and more particularly the heel portion of it so that its edge 117 will not interfere with or abrade the cam bearing surface 105. As a result, it is possible to provide a very good bearing surface and easy machining. Also, this construction permits the intake valves 68, 78 and 77 all to have the same configuration. That is, these valves all can have the same length and, therefore, only a single valve component need be provided for each intake valve, even though the valves are disposed at different angles. This greatly facilitates and minimizes the number of parts required for the engine.

Figure 8:
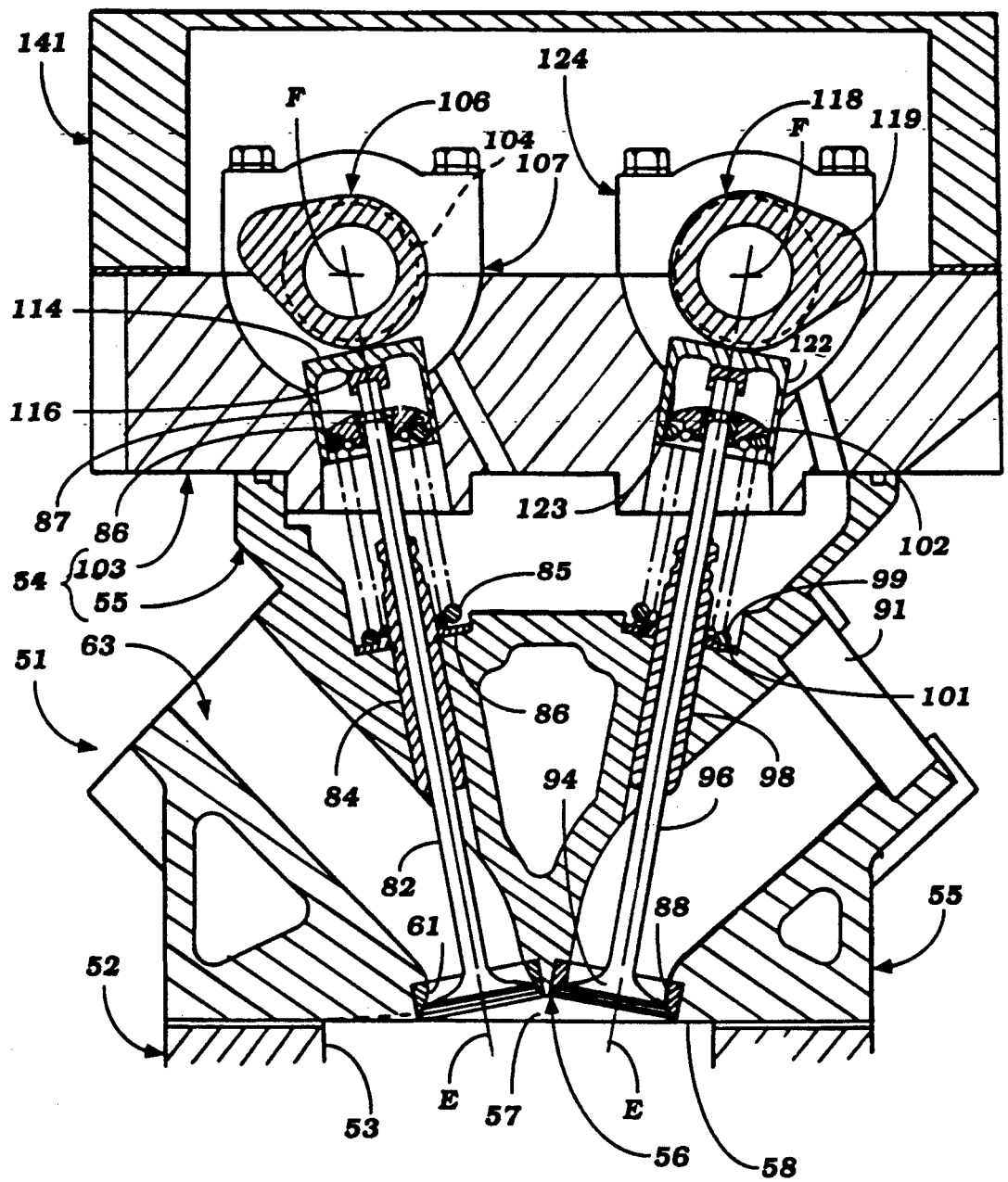
FIG. 8 is a cross sectional view taken through a cylinder of an internal combustion engine constructed in accordance with an embodiment of the invention and passing through one of the side intake valves and one of the exhaust valves.

The exhaust valves 92 and 93 are operated in a similar manner to the intake valves in that there is journaled in the cam carrier 103 an exhaust camshaft 118 that has a pair of tapered cam lobes 119 and 121 that cooperate with thimble tappets 122, only one of which appears in FIG. 8, which are slidably supported in bores 123 formed in the cam carrier 103. The cam lobes 119 and 121 are tapered so as to provide the desired operation and the heel diameter is larger than the bearing areas 123 of the exhaust camshaft 18 for the aforenoted reasons. Bearing caps 124 are affixed to the cam carrier 103 and cylinder head casting 15 in the manner previously described so as to journal the exhaust camshafts 118.

It should be noted that roller bearings 125 and 126 may also be provided at the ends of the intake and exhaust camshafts 106 and 118, respectively, for journaling these shafts. Since the construction of the exhaust camshaft 118 and its functioning is the same as that of the intake camshaft except that the center lobe is not required due to the fact that it operates two valves rather than three, further description is believed to be unnecessary.

The intake and exhaust camshafts 106 and 118 rotate about axes F that are parallel to each other and which are intersected generally by the stems of the respective valves at the point of contact with the thimble tappets. The camshafts 106 and 108 may be driven in any suitable manner but in a preferred embodiment, a drive gear 127 is associated with the exhaust camshaft 118 and is driven from the crankshaft of the engine (not shown) through an appropriate gear train. The gear 127 has a hub portion 128 that is adapted to receive a drive pin 129 which, in turn, is affixed to an annular member 131 that has a key connection 132 to the exhaust camshaft 118. It should be noted that a variety of holes may be provided for timing purposes between the member 132 and the gear hub 128. A nut mechanism 133 locks the exhaust camshaft drive 118 in position.

The intake camshaft has associated with it a drive gear 134 that is enmeshed with and driven by the exhaust camshaft drive gear 127. The gear 134 has a hub portion 135 that receives a pin 136 so as to couple it to an annular member 137 which has a key connection 138 to the intake camshaft 106 for driving it. A nut 139 affixes the drive connection together and, as aforedescribed, a number of holes may be incorporated so as to permit timing adjustment.

The valve train as thus far described is enclosed by means of a cam cover 141 that is affixed to the cylinder head assembly 54 in an appropriate manner. In addition, a spark plug 142 is disposed in the cylinder head casting 55 generally on the cylinder bore axis.

It should be readily apparent from the foregoing description that the described embodiment of the invention permits a very good combustion chamber configuration that will provide not only good breathing through the use of five valves per cylinder but which will also insure that the combustion chamber is extremely smooth, has a relatively small surface area and will permit high compression ratios. The smooth surface also insures against pre ignition or hot spots. In addition, the camshaft and valve actuating mechanism may be quite simple and can be inexpensively manufactured. It is to be understood that the foregoing description is that of a preferred embodiment of the invention. Various changes and modifications may be made without departing from the spirit and scope of the invention, as defined by the appended claims.

I claim:

1. A combustion chamber and valve arrangement for an internal combustion engine having a cylinder bore closed at one end by a cylinder head having a surface facing said cylinder bore, a pair of valve seats formed in said cylinder head surface defining flow ports communicating with said combustion chamber, a pair of poppet valves supported for reciprocation about respective axes by said cylinder head and each having a head portion for cooperating with said valve seats for controlling the flow through said flow ports, said axes of reciprocation of said valves being angularly disposed relative to each other and not lying in parallel planes, said valves being disposed so that the adjacent edges of their heads lie in substantially a common plane extending perpendicular to the axis of the cylinder bore.

2. A combustion chamber and valve arrangement as set forth in claim 1 wherein one of the valves reciprocates about an axis that extends in a plane containing the cylinder bore axis.

3. A combustion chamber and valve arrangement as set forth in claim 2 wherein the other valve of the pair lies on one side of the plane and further including a third valve reciprocating about an axis angularly disposed to the other valve axes and not lying in a common plane with either of the valve reciprocated axes and on the opposite side of said plane.

4. A combustion chamber and valve arrangement as set forth in claim 3 wherein the valves are all operated by a single camshaft.

5. A combustion chamber and valve arrangement as set forth in claim 4 wherein the single camshaft has individual cam lobes, each directly associated with a respective one of the valves for operating the valves and wherein the cam lobes associated with the other and third valves are tapered.

6. A combustion chamber and valve arrangement as set forth in claim 5 further including bearing surfaces disposed between the adjacent cam lobes.

7. A combustion chamber and valve arrangement as set forth in claim 6 wherein the heel diameter of each of the cam lobes is greater than the diameter of the bearing surface and the heel diameter of the tapered lobes is sufficiently large so as to permit grinding of the cam surface without interference with the bearing surface.

8. A combustion chamber and valve arrangement as set forth in claim 3 wherein there are provided a second pair of valve seats on the other side of a plane containing the axis of the cylinder bore and perpendicular to the first mentioned plane and a second pair of poppet valves supported for reciprocation about respective axes by the cylinder head and each having a head portion for cooperating with said second pair of valve seats, the axes of reciprocation of said second pair of poppet valves being angularly disposed relative to each other and not lying in parallel planes, said second pair of poppet valves being disposed so that adjacent edges of their heads lie in substantially a common plane extending perpendicular to the axis of the cylinder bore.

9. A combustion chamber and valve arrangement as set forth in claim 8 wherein the first pair of valves and the third valve are operated by a first camshaft and the second pair of valves is operated by a second camshaft.

10. A combustion chamber and valve arrangement as set forth in claim 9 wherein all of the valves are directly operated by the respective camshafts.

11. A combustion chamber and valve arrangement as set forth in claim 10 wherein each cam shaft is formed with a plurality of lobes, each operating a respective valve.

12. A combustion chamber and valve arrangement as set forth in claim 11 wherein the cam lobes on the camshaft that operates the other and third valve are tapered and wherein the cam lobes on the other camshaft that operates the second pair of valves are tapered.

13. A combustion chamber and valve arrangement as set forth in claim 12 further including bearing surfaces formed on each of the camshafts between the cam lobes.

14. A combustion chamber and valve arrangement as set forth in claim 13 wherein the heel diameter of each of the cam lobes is greater than the diameter of the bearing surface and the heel diameter of the tapered lobes is sufficiently large so as to permit grinding of the cam surface without interference with the bearing surface.

15. A camshaft for an internal combustion engine having a pair of cam lobes separated by a bearing surface, at least one of said cam lobes being tapered and having a mean heel diameter that is greater than the diameter of the adjacent bearing surface for permitting grinding of the cam lobe without interference with the bearing surface.

16. A camshaft as set forth in claim 15 wherein the other of the cam lobes has a cylindrical heel surface that is larger in diameter than the bearing surface.

17. A camshaft as set forth in claim 16 further including a third cam lobe disposed on the side of the cam lobe having the cylindrical heel opposite to the tapered cam lobe, said third cam lobe being separated from the other cam lobes by a bearing surface and being tapered, the heel diameter of said third cam lobe being greater than the diameter of the adjacent bearing surface for grinding the heel of the third ca lobe without interfering with the adjacent bearing surface.

18. A camshaft as set forth in claim 15 further including a third cam lobe disposed on the side of the cam lobe having the cylindrical heel opposite to the tapered cam lobe, said third cam lobe being separated from the other cam lobes by a bearing surface and being tapered, the heel diameter of said third cam lobe being greater than the diameter of the adjacent bearing surface for grinding the heel of the third cam lobe without interfering with the adjacent bearing surface.

* * * * *